United States Patent
Hsu et al.

(10) Patent No.: US 9,940,422 B2
(45) Date of Patent: Apr. 10, 2018

(54) METHODS FOR REDUCING CONGESTION REGION IN LAYOUT AREA OF IC

(71) Applicant: MediaTek Inc., Hsin-Chu (TW)

(72) Inventors: Chin-Hsiung Hsu, Taoyuan (TW); Chun-Chih Yang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 41 days.

(21) Appl. No.: 14/743,099

(22) Filed: Jun. 18, 2015

(65) Prior Publication Data

US 2016/0203254 A1  Jul. 14, 2016

Related U.S. Application Data (60) Provisional application No. 62/101,059, filed on Jan. 8, 2015.

(51) Int. Cl.
*G06F 17/50* (2006.01)
*H03K 19/177* (2006.01)

(52) U.S. Cl.
CPC ...... *G06F 17/5072* (2013.01); *G06F 17/5077* (2013.01); *G06F 17/50* (2013.01); *G06F 17/5054* (2013.01); *G06F 17/5081* (2013.01); *G06F 2217/08* (2013.01); *G06F 2217/78* (2013.01); *H03K 19/17728* (2013.01); *H03K 19/17736* (2013.01); *H03K 19/17756* (2013.01); *H03K 19/17796* (2013.01)

(58) Field of Classification Search
CPC ............. G06F 17/5054; G06F 2217/78; G06F 17/5072; G06F 17/50; G06F 17/5077; G06F 17/5081; G06F 2217/08; H03K 19/17756; H03K 19/17796; H03K 19/17728
See application file for complete search history.

(56) References Cited

U.S. PATENT DOCUMENTS

| | | | | |
|---|---|---|---|---|
| 5,583,788 A * | 12/1996 | Kuribayashi | ....... | G06F 17/5077 257/208 |
| 5,659,484 A * | 8/1997 | Bennett | ............... | G06F 17/5031 716/113 |
| 5,793,644 A * | 8/1998 | Koford | ............... | G06F 17/5072 706/13 |
| 5,982,193 A * | 11/1999 | Agrawal | .......... | H03K 19/17744 326/39 |
| 6,286,128 B1 * | 9/2001 | Pileggi | .................. | G06F 17/505 716/104 |

(Continued)

*Primary Examiner* — Helen Rossoshek
(74) *Attorney, Agent, or Firm* — McClure, Qualey & Rodack, LLP (57) ABSTRACT

A method for reducing congestion regions of an integrated circuit is provided. A placement of the IC is obtained, wherein the placement includes a signal path between a first macro module and a second macro module. The signal path passes through a routing area of the placement for transmitting a specific signal. A congestion region of the routing area is identified. The signal path includes at least one cell or routing path in the congestion region. A cost evaluation is obtained for each candidate position of the routing area by moving the cell or the routing path out of the congestion region. The cell is moved to the candidate position having a minimum cost evaluation among the cost evaluations. The placement and the routing paths are simultaneously updated according to the cell moved to the candidate position having the minimum cost evaluation.

16 Claims, 10 Drawing Sheets

(56) References Cited

U.S. PATENT DOCUMENTS

| | | | |
|---|---|---|---|
| 6,370,677 B1* | 4/2002 | Carruthers | G06F 17/5054 716/121 |
| 6,415,426 B1* | 7/2002 | Chang | G06F 17/5072 716/113 |
| 6,480,991 B1* | 11/2002 | Cho | G06F 17/5072 716/122 |
| 6,590,417 B1* | 7/2003 | Jones | H03K 19/17736 326/38 |
| 6,642,556 B2* | 11/2003 | Ulrey | G06F 17/5068 257/208 |
| 6,996,512 B2* | 2/2006 | Alpert | G06F 17/5072 703/14 |
| 7,225,116 B2* | 5/2007 | Harn | G06F 17/5077 700/97 |
| 7,340,711 B2* | 3/2008 | Hetzel | G06F 17/5077 716/130 |
| 7,342,414 B2* | 3/2008 | DeHon | H04L 45/26 326/37 |
| 7,346,879 B2* | 3/2008 | Cho | G06F 17/5072 716/129 |
| 7,496,879 B2* | 2/2009 | Rohe | G06F 17/5054 716/134 |
| 7,752,588 B2* | 7/2010 | Bose | G06F 17/5072 716/122 |
| 7,904,848 B2* | 3/2011 | Coene | G06F 9/5066 716/111 |
| 7,921,393 B2* | 4/2011 | Furnish | G06F 17/5068 716/110 |
| 7,966,595 B1* | 6/2011 | Chong | G06F 17/5072 716/118 |
| 8,010,929 B2* | 8/2011 | Malhotra | G06F 17/5077 716/130 |
| 8,069,431 B1* | 11/2011 | Zhang | G06F 17/5054 716/128 |
| 8,181,139 B1* | 5/2012 | Chen | G06F 17/5072 716/116 |
| 8,595,671 B2* | 11/2013 | He | G06F 17/5054 716/116 |
| 8,661,388 B2* | 2/2014 | Chen | G06F 17/5072 716/118 |
| 8,686,428 B1* | 4/2014 | Sekar | H01L 21/8221 257/173 |
| 8,782,591 B1* | 7/2014 | Ku | G06F 17/505 716/103 |
| 8,806,407 B2* | 8/2014 | Yu | G06F 17/5077 716/130 |
| 8,935,647 B2* | 1/2015 | Caldwell | G06F 17/505 703/16 |
| 2007/0157146 A1* | 7/2007 | Chen | G06F 17/5072 257/798 |
| 2007/0300193 A1* | 12/2007 | Lillis | G06F 17/5072 716/113 |
| 2013/0241026 A1* | 9/2013 | Or-Bach | H01L 21/8221 257/506 |
| 2013/0305199 A1* | 11/2013 | He | G06F 17/5054 716/104 |
| 2015/0178436 A1* | 6/2015 | Chen | G06F 17/5054 716/117 |
| 2015/0248512 A1* | 9/2015 | Shen | G06F 17/5027 716/113 |
| 2016/0335386 A1* | 11/2016 | Hsu | G06F 17/5072 |

\* cited by examiner

METHODS FOR REDUCING CONGESTION REGION IN LAYOUT AREA OF IC

CROSS REFERENCE TO RELATED APPLICATIONS

This Application claims priority of U.S. Provisional Application No. 62/101,059, filed on Jan. 8, 2015, the entirety of which is incorporated by reference herein.

BACKGROUND OF THE INVENTION

Field of the Invention

The invention relates to a method for reducing congestion regions in layout area of an integrated circuit (IC), and more particularly to a method for reducing congestion regions in layout area of an IC by simultaneously redistributing the cell resources and the routing resources.

Description of the Related Art

In recent years, the development process of integrated circuits (ICs) such as super larger scale integrated circuits (LSIs) has generally utilized computer assisted design (CAD). According to a development process based on CAD, abstract circuit data, which corresponds to functions of an integrated circuit to be developed, is defined by using a so-called hardware description language (HDL), and the defined circuit is used to form a concrete circuit structure to be mounted on a chip.

Before the IC chips are manufactured (or implemented), the placements and the layout areas of the IC chips are considered first so as to determine the die size of each IC chip. In general, the die size will affect the manufacturing cost for the IC chip. Therefore, it is desirable to optimize the placements of an IC chip for minimizing the layout area of the IC chip.

BRIEF SUMMARY OF THE INVENTION

Methods for reducing congestion regions in a layout of an integrated circuit and a non-transitory computer-readable storage medium storing instructions are provided. An embodiment of a method for reducing congestion regions in a layout of an integrated circuit is provided. A placement of the integrated circuit is obtained, wherein the placement comprises a first signal path between a first macro module and a second macro module, and the first signal path passes through a routing area of the placement for transmitting a specific signal. A congestion region of the routing area is identified, wherein the first signal path comprises at least one cell or at least one routing path in the congestion region. A cost evaluation is obtained for each candidate position of the routing area by moving the cell or the routing path out of the congestion region. The cell or the macro module corresponding to the routing path is moved to the candidate position having a minimum cost evaluation among the cost evaluations, and the placement and the routing paths are simultaneously updated according to the cell or the macro module moved to the candidate position having the minimum cost evaluation.

Furthermore, another embodiment of a method for reducing congestion regions in a layout of an integrated circuit is provided. A placement of the integrated circuit is obtained, wherein the placement comprises a first signal path between a first macro module and a second macro module. A congestion region of a routing area of the placement and a sparse region of the routing area adjacent to the congestion region are obtained, wherein the first signal path comprises at least one cell in the congestion region and a plurality of routing paths corresponding to the cell. A plurality of candidate positions are obtained within the sparse region, wherein each of the candidate positions is an unoccupied area capable of placing the cell. A cost evaluation is calculated for each of the candidate positions by moving the cell from the congestion region to the candidate position. The placement and the routing paths are simultaneously updated according to a second signal path between the first macro module and the second macro module, wherein the second signal path comprises the cell moved to the candidate position having a minimum cost evaluation among the cost evaluations.

Moreover, an embodiment of a non-transitory computer-readable storage medium storing instructions that, when executed by a computer, cause the computer to perform a method for reducing congestion regions in a layout of an integrated circuit is provided. A placement of the integrated circuit is obtained, wherein the placement comprises a first signal path between a first macro module and a second macro module, and the first signal path passes through a routing area of the placement for transmitting a specific signal. A congestion region of the routing area is identified, wherein the first signal path comprises at least one cell or at least one routing path in the congestion region. A cost evaluation is obtained for each candidate position of the routing area by moving the cell or the routing path out of the congestion region. The cell or the macro module corresponding to the routing path is moved to the candidate position having a minimum cost evaluation among the cost evaluations, and the placement and the routing paths are simultaneously updated according to the cell or the macro module moved to the candidate position having the minimum cost evaluation.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
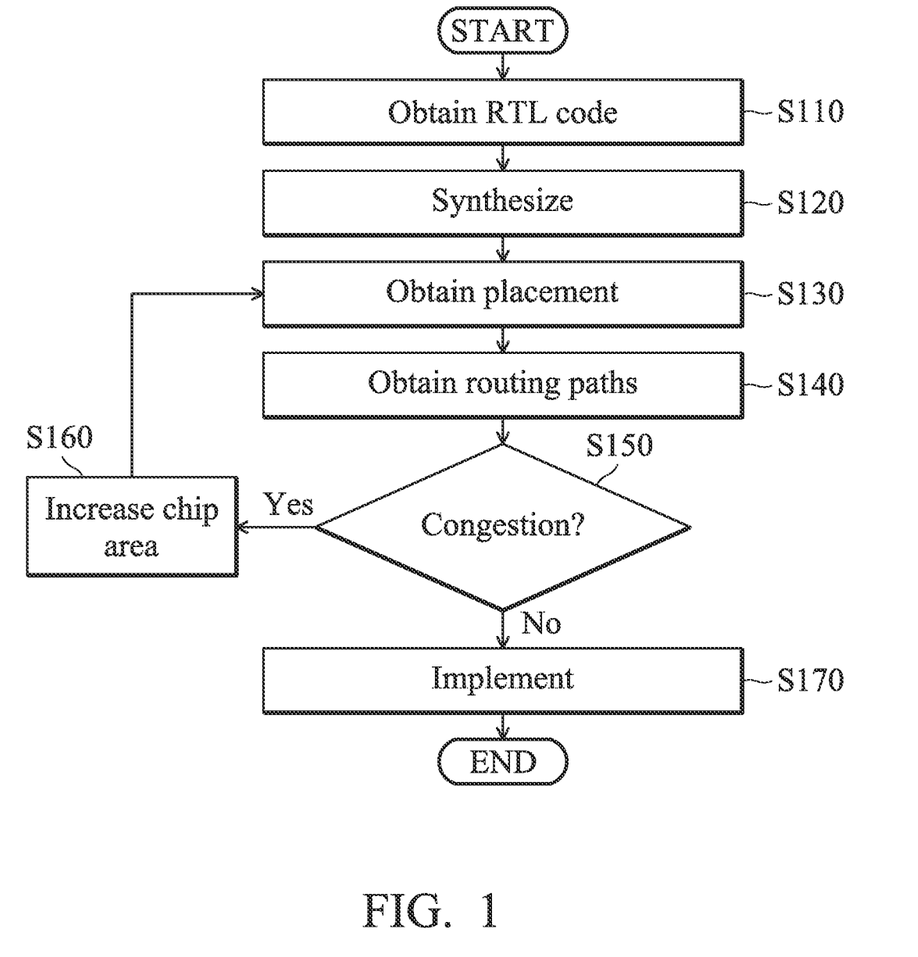
FIG. 1 shows a flow chart illustrating a typical hierarchical design process of an integrated circuit (IC)

FIG. 1 shows a flow chart illustrating a typical hierarchical design process of an integrated circuit (IC). First, in step S110, a register-transfer-level (RTL) code describing the function performed by the IC is obtained. Next, in step S120, the RTL code is synthesized to generate gates for the IC. Next, in step S130, a placement procedure is performed to generate a placement of the gates within a chip area of the IC. Next, the routing paths are obtained according to the placement (step S140), and then it is checked whether there is any congestion in the placement according to the routing paths (step S150). If there is no congestion, the IC is implemented according to the placement and routing paths (step S170). If there is congestion, the chip area of the IC must be increased to handle the congestion (step S160), and then the automatic place and route (APR) procedure is performed again (steps S130 and S140) so as to generate a new placement of the gates with corresponding routing paths within the increased chip area of the IC.

Figure 2:
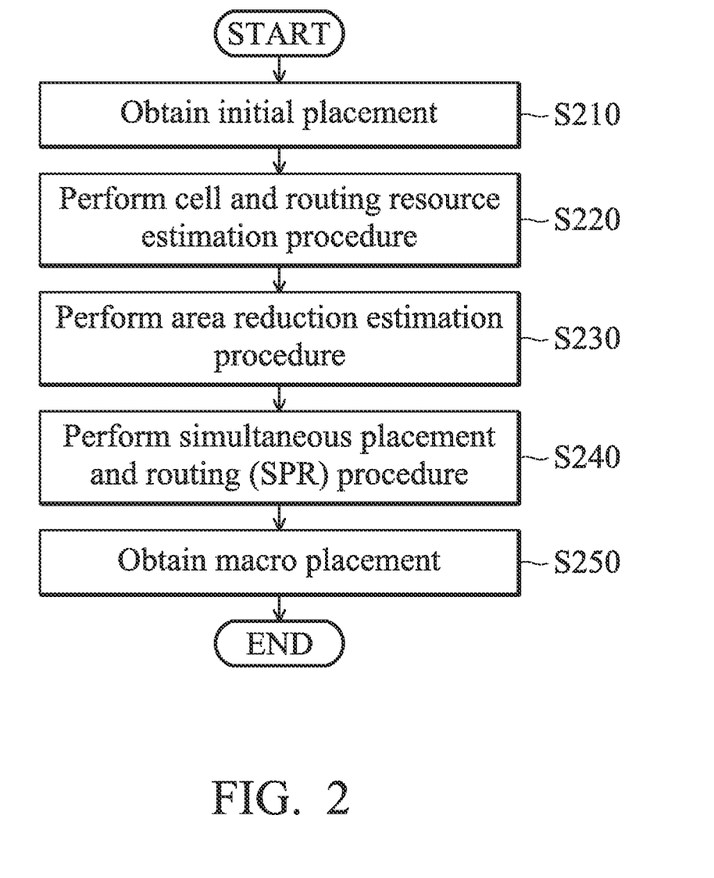
FIG. 2 shows a method for reducing congestion regions in a layout of the IC according to an embodiment of the invention.

FIG. 2 shows a method for reducing congestion regions in a layout of an integrated circuit (IC) according to an embodiment of the invention, wherein the method of FIG. 2 is performed by a computer capable of operating an electronic design automation (EDA) tool. First, in step S210, a processor of the computer obtains an initial placement of the IC, and the initial placement can be displayed in a graphical user interface (GUI). Next, the processor performs a cell and routing resource estimation procedure according to the cell resources and the routing resources of the initial placement (step S220) so as to obtain cell densities and routing densities of the initial placement. Next, in step S230, the processor performs an area reduction estimation procedure according to the cell densities, the routing densities and an area size of the initial placement. According to the estimation result of the area reduction estimation procedure, the processor performs a simultaneous placement and routing (SPR) procedure to simultaneously redistribute the cell resources and the routing resources (step S240), so as to obtain a macro placement with higher utilization rate (U-rate), less congestion, and a smaller area (step S250).

Figure 3:
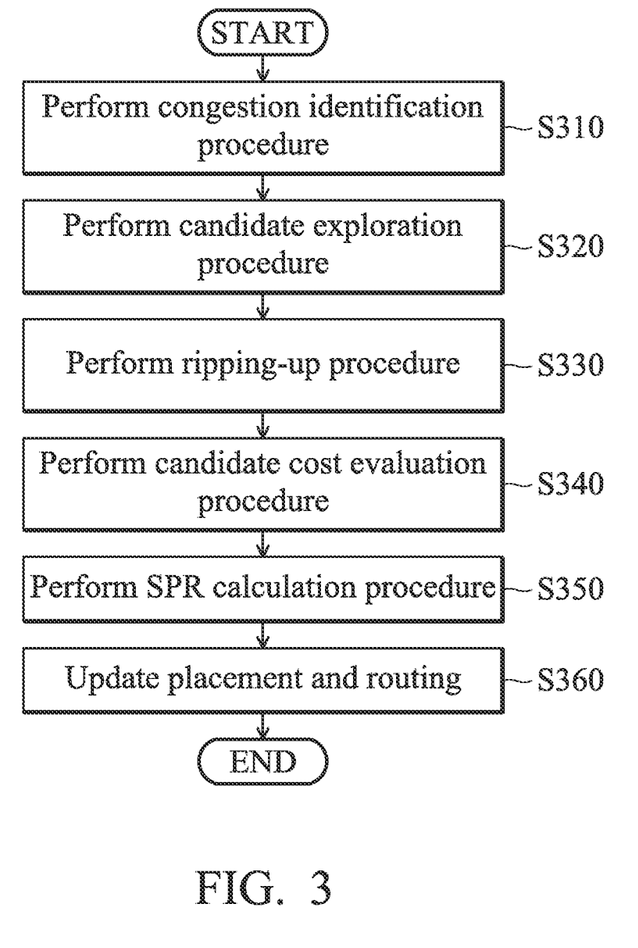
FIG. 3 shows a flow chart illustrating the SPR procedure (step S240) of FIG. 2 according to an embodiment of the invention.
Figure 4:
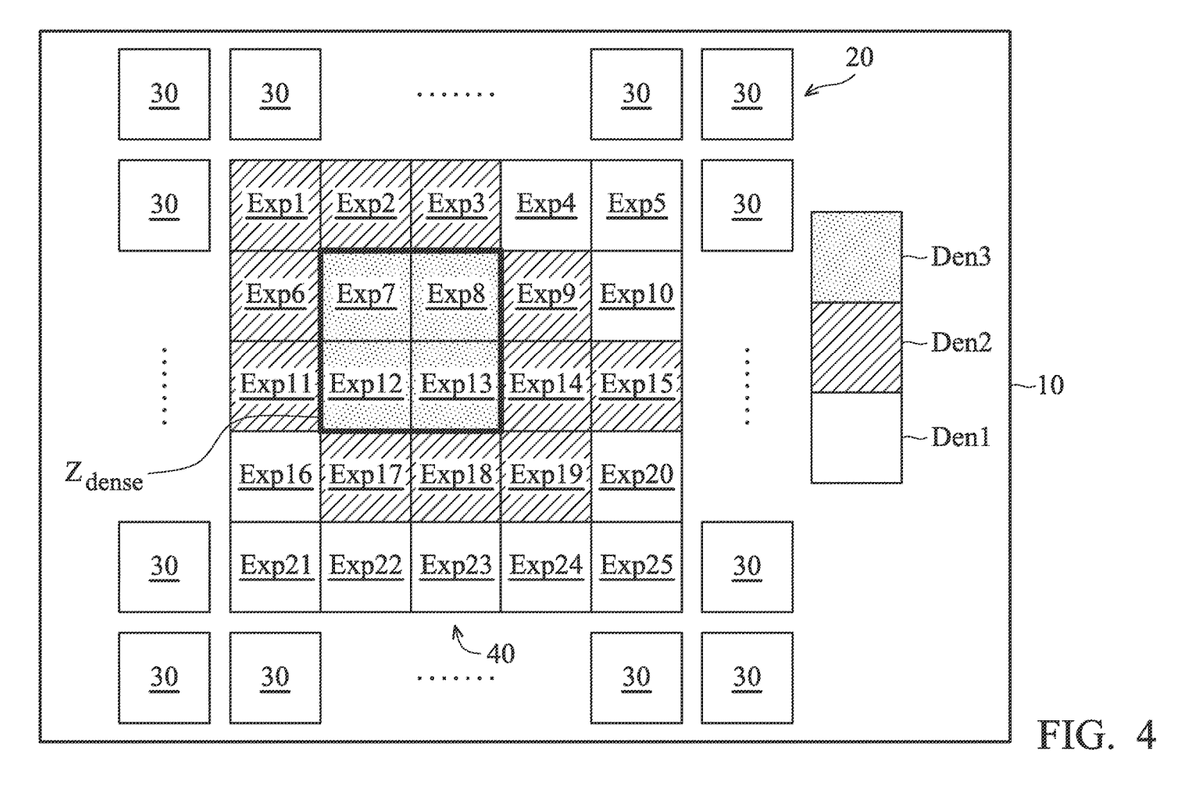
FIG. 4 shows an example of an initial placement according to step S310 of FIG. 3.

FIG. 3 shows a flow chart illustrating the SPR procedure (step S240) of FIG. 2 according to an embodiment of the invention. First, in step S310, the processor performs a congestion identification procedure according to the cell densities and routing densities of the initial placement, so as to identify a congestion region in the initial placement. Furthermore, the processor further decides which cell needs to be moved out of the congestion region for decreasing the degree of congestion. FIG. 4 shows an example of an initial placement 10 according to step S310 of FIG. 3. The initial placement 10 comprises a routing area 20, wherein a plurality of the macro modules 30 are arranged in a surrounding portion of the routing area 20. In one embodiment, the routing area 20 is determined according to the chip boundary of the IC. When the congestion identification procedure is performed, the processor divides a center portion 40 of the routing area 20 into a plurality of exploration regions Exp1-Exp25, and obtains a cell density and a routing density for each exploration region. In the embodiment, the exploration regions Exp1-Exp25 are classified as three degrees of density according to the cell densities and the routing densities. For example, the exploration regions Exp4-Exp5, Exp10, Exp16 and Exp20-Exp25 belong to a first degree of density Den1. Furthermore, the exploration regions Exp1-Exp3, Exp6, Exp9-Exp11, Exp14-Exp15 and Exp17-Exp19 belong to a second degree of density Den2 that is denser than the first degree of density Den1. Moreover, the exploration regions Exp7-Exp8 and Exp12-Exp13 belong to a third degree of density Den3 that is denser than the second degree of density Den3. Thus, the processor can identify that a congestion region Zdense is formed by the exploration regions Exp7-Exp8 and Exp12-Exp13 that have a cell density or a routing density greater than a specific density. Simultaneously, the processor further decides which cells in the congestion region Zdense need to be moved out of the congestion region Zdense. For example, the processor will obtain which signal path between the macro modules 30 passes through the congestion region Zdense, and decide which cell in the signal path can be moved.

Figure 5:
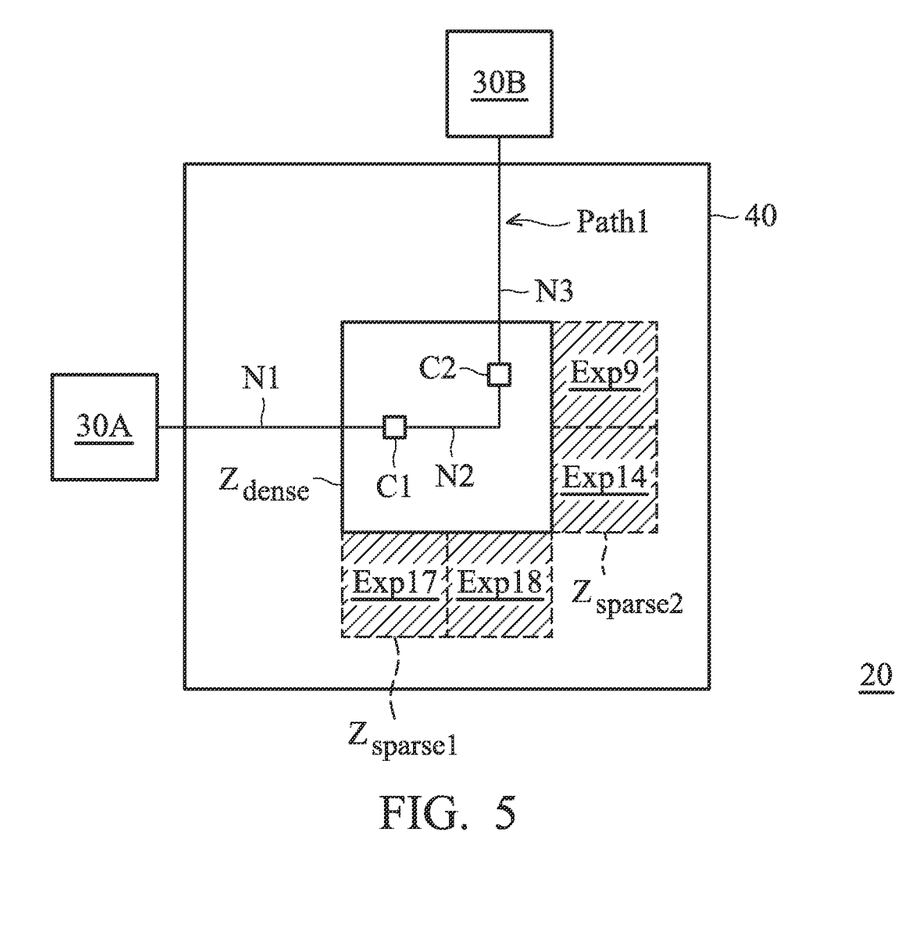
FIG. 5 shows an example of the signal path and the sparse regions according to step S320 of FIG. 3.

As illustrated in FIG. 3, subsequent to step S310, according to the decided cells, the processor performs a candidate exploration procedure on the initial placement (step S320) so as to obtain at least one sparse region for the decided cells. The sparse region is formed by the exploration regions adjacent to the congestion region $Z_{dense}$, wherein the adjacent exploration regions have sparser density than the exploration regions of the congestion region $Z_{dense}$. Furthermore, the sparse region has enough space to dispose the decided cells. For example, each sparse region comprises a plurality of candidate positions, wherein each candidate position is an unoccupied area capable of placing the decided cell. FIG. 5 shows an example of the signal path and the sparse regions according to step S320 of FIG. 3. A signal path Path1 is used to transmit a specific signal between the macro modules 30A and 30B, wherein the signal path Path1 is formed by the nets N1-N3 and the cells C1 and C2, wherein the cells C1 and C2 are disposed in the congestion region $Z_{dense}$. The nets N1-N2 are the routing paths corresponding to the cell C1, wherein the cell C1 is coupled to the macro module 30A via the net N1 and coupled to the cell C2 via the net N2. Furthermore, the nets N2-N3 are the routing paths corresponding to the cell C2, wherein the cell C2 is coupled to the cell C1 via the net N2 and the macro module 30B via the net N3. In FIG. 5, the processor can obtain the sparse regions $Z_{sparse1}$ and $Z_{sparse2}$. The sparse region $Z_{sparse1}$ adjoins the lower side of the congestion region $Z_{dense}$, and the sparse region $Z_{sparse1}$ is formed by the exploration regions Exp17 and Exp18. The sparse region $Z_{sparse2}$ adjoins the right side of the congestion region $Z_{dense}$, and the sparse region $Z_{sparse2}$ is formed by the exploration regions Exp9 and Exp14.

Figure 6:
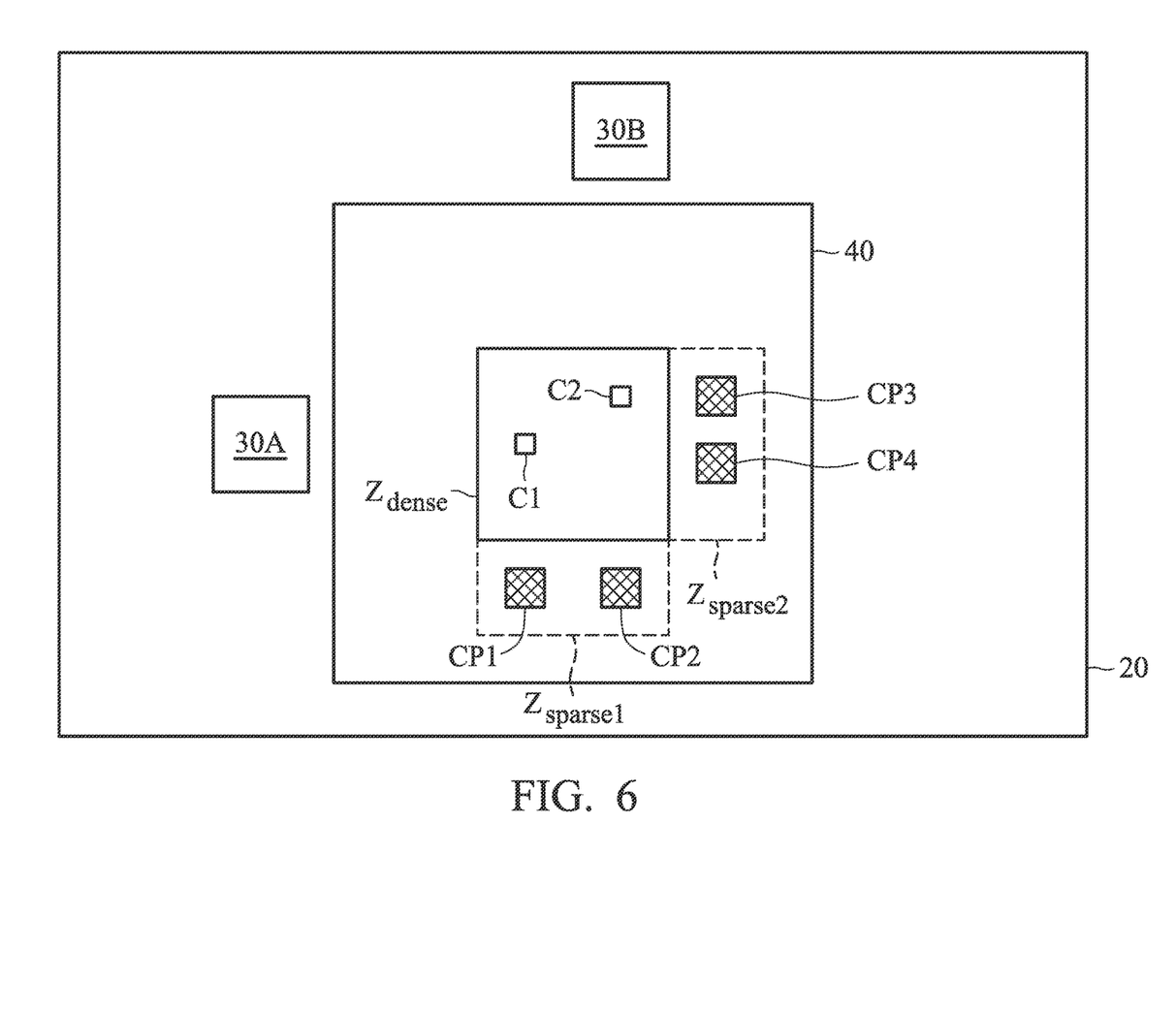
FIG. 6 shows an example of the candidate positions of the decided cell according to step S340 of FIG. 3.

As illustrated in FIG. 3, subsequent to step S320, the processor performs a ripping-up procedure on the signal paths corresponding to the decided cells in the congestion region (step S330) so as to rip the nets of the signal paths. Next, in step S340, the processor performs a candidate cost evaluation procedure, to obtain a cost evaluation for each candidate position. In the embodiment, the cost evaluation of the candidate position of the decided cell is obtained by assuming that the decided cell is moved to the candidate position (i.e. a placement cost of the candidate position) and the nets of the decided cell are also rerouted (e.g. a routing cost of the candidate position). FIG. 6 shows an example of the candidate positions of the decided cell according to step S340 of FIG. 3. In FIG. 6, when the ripping-up procedure of step S330 of FIG. 3 is performed, the nets of the signal path Path1 are ripped-up for accurate cost evaluation. In the embodiment, assuming that the sparse region $Z_{sparse1}$ comprises two candidate positions CP1 and CP2 for the cell C1, and the sparse region $Z_{sparse2}$ comprises two candidate positions CP3 and CP4 for the cell C2. Thus, the processor will obtain the cost evaluations of the candidate positions CP1-CP4, respectively. For example, the processor will move the cell C1 to the candidate position CP1 and obtain a placement cost of the candidate position CP1. Furthermore, when the cell C1 is moved to the candidate position CP1, the routing paths of the moved cell C1 are rerouted and then a routing cost of the candidate position CP1 is obtained, such as the net between the macro module 30A and the candidate position CP1, the net between the candidate positions CP1 and CP3, and the net between the candidate positions CP1 and CP4. Similarly, the processor will move the cell C2 to the candidate position CP3 and obtain a placement cost of the candidate position CP3. Furthermore, when the cell C2 is moved to the candidate position CP3, the routing paths of the moved cell C2 are rerouted and then a routing cost of the candidate position CP3 is obtained, such as the net between the macro module 30B and the candidate position CP3, the net between the candidate positions CP3 and CP1, and the net between the candidate positions CP3 and CP2. In general, each decided cell has a plurality of candidate positions with the corresponding cost evaluations.

Figure 7:
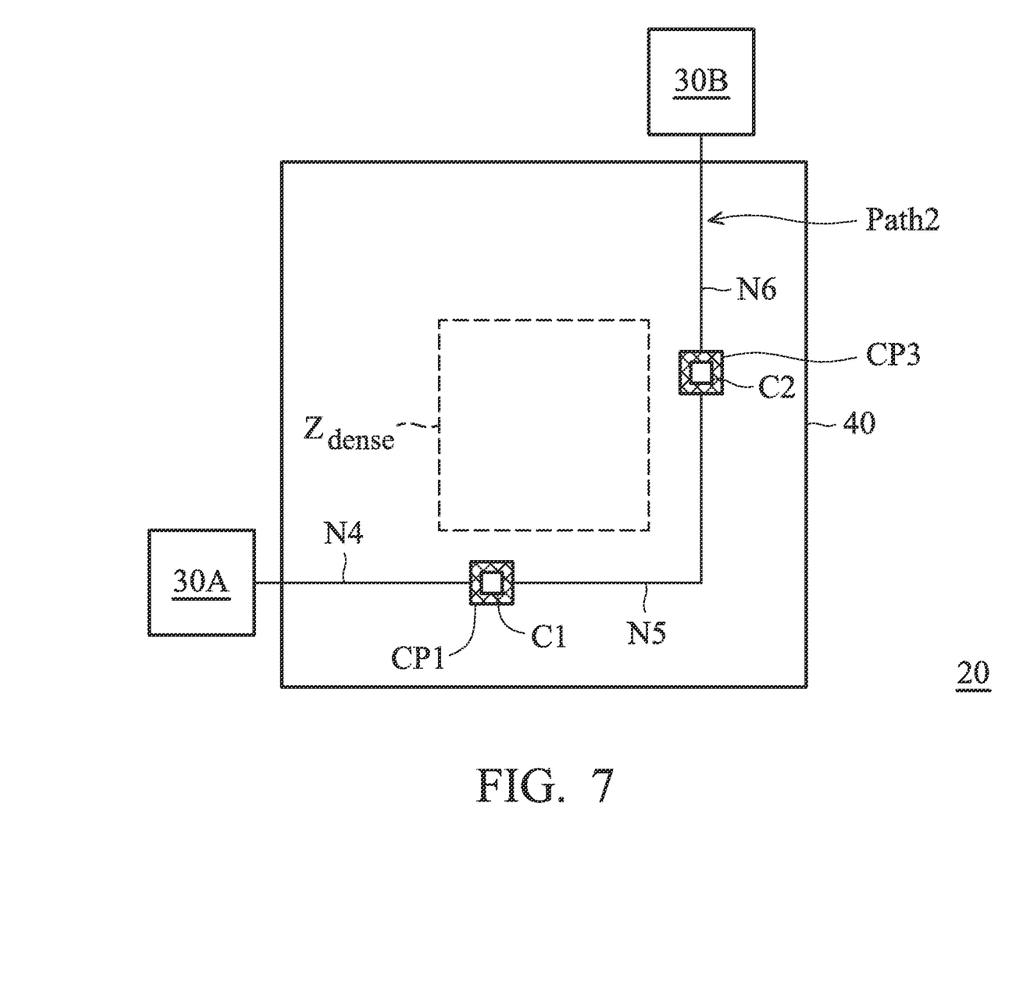
FIG. 7 shows an example of a new signal path in the updated placement according to step S360 of FIG. 3.

As illustrated in FIG. 3, subsequent to step S340, the processor performs a best SPR calculation procedure according to the cost evaluations of each candidate position, so as to select the best candidate position of each decided cell having a minimum cost evaluation from the corresponding candidate positions (step S350). Next, in step S360, according to the selected candidate positions, the initial placement is updated by moving the decided cells to the selected candidate positions, so as to obtain a new placement. Simultaneously, the routing paths of the selected candidate positions are also obtained. Thus, a new signal path of the specific signal is formed by the moved cells and the corresponding routing paths, wherein the new signal path does not pass through the congestion region. Specifically, the placement and the routing can be updated at the same time. In one embodiment, the processor can move the macro modules coupled to the new signal path to the suitable positions, so as to further shorten the distance of the new signal path. FIG. 7 shows an example of a new signal path in the updated placement 10 according to step S360 of FIG. 3. In the embodiment, the cell C1 is moved to the candidate position CP1 and the cell C2 is moved to the candidate position CP3, thus a signal path Path2 is formed according to the cell C1 moved to the candidate position CP1, and the cell C2 moved to the candidate position CP3 and the nets N4-N6. The nets N4-N5 are the routing paths corresponding to the moved cell C1, wherein the moved cell C1 is coupled to the macro module 30A via the net N4 and coupled to the mover cell C2 via the net N5. Furthermore, the nets N5-N6 are the routing paths corresponding to the moved cell C2, wherein the moved cell C2 is coupled to the moved cell C1 via the net N5 and the macro module 30B via the net N6. In the embodiment, the macro modules 30A and 30B are moved to new positions, so as to shorten the distance of the signal path Path2.

According to the SPR procedure of the embodiments, the placement and routing resources of the IC can be redistributed simultaneously. The congestion region in the layout area can be solved without increasing the layout area, thus the layout area of the IC can be minimized.

Figure 8:
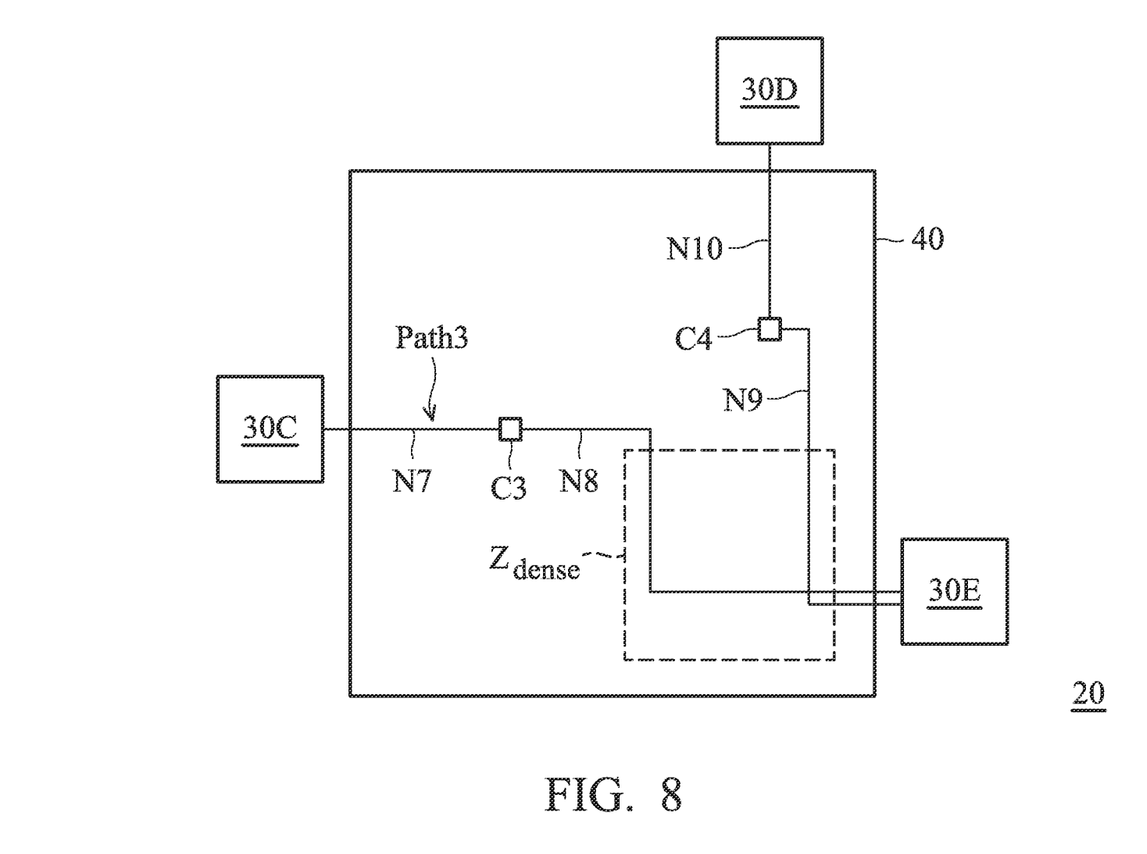
FIG. 8 shows another example of the signal path according to step S320 of FIG. 3.
Figure 9:
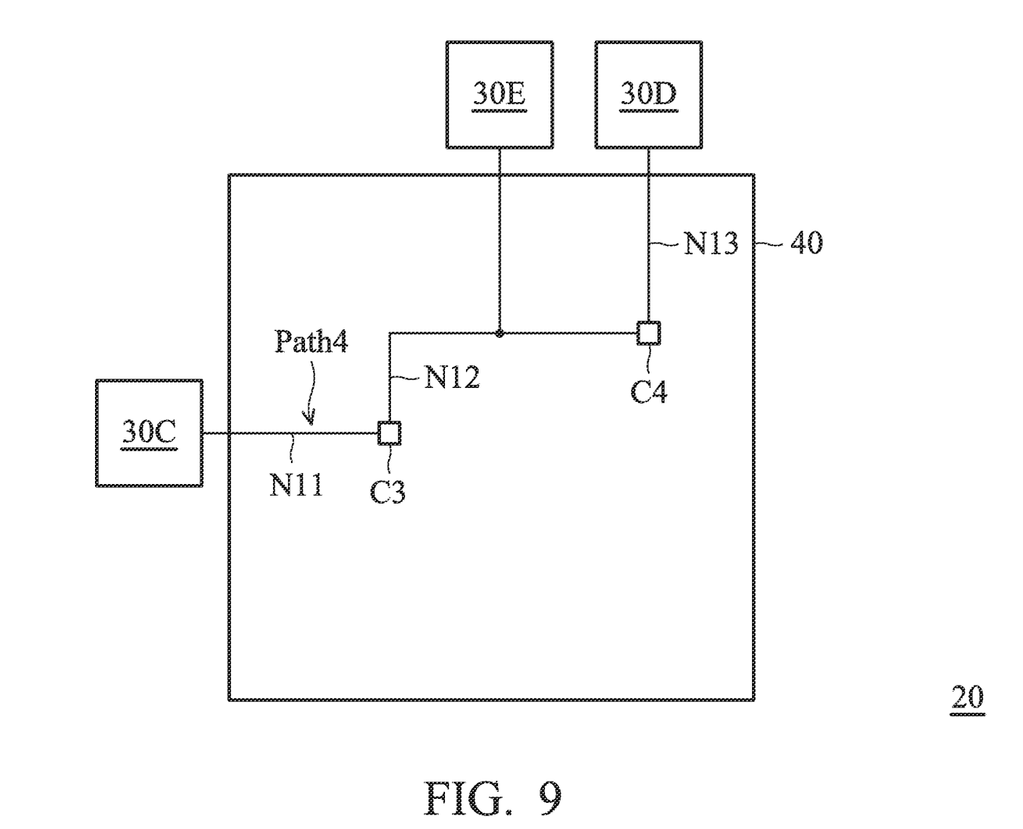
FIG. 9 shows another example of a new signal path in the updated placement according to step S360 of FIG. 3.

FIG. 8 shows another example of the signal path according to step S320 of FIG. 3. A signal path Path3 is used to transmit a specific signal from the macro module 30C to the macro module 30D via the macro module 30E, wherein the signal path Path3 is formed by the nets N7-N10 and the cells C3 and C4. The nets N7-N8 are the routing paths corresponding to the cell C3, wherein the cell C1 is coupled to the macro module 30C via the net N7 and coupled to the macro module 30E via the net N8. Furthermore, the nets N9-N10 are the routing paths corresponding to the cell C4, wherein the cell C4 is coupled to the macro module 30E via the net N9 and the macro module 30D via the net N10. In FIG. 8, the processor obtains that the nets N8 and N9 pass through the congestion region $Z_{dense}$. In one embodiment, except for deciding which cell needs to be moved out of the congestion region for decreasing the degree of congestion, the processor further decides which macro module needs to be move, so as to decrease the degree of congestion. For example, except for the candidate positions of the decided cell, the processor performs the candidate cost evaluation procedure, to further obtain a cost evaluation for each candidate position of the decided macro module. Thus, the processor performs the ripping-up procedure (e.g. step S330 of FIG. 3), and the nets of the signal path Path3 are ripped-up for accurate cost evaluation. In the embodiment, the processor will move the macro modules 30C, 30D or 30E to any candidate position and obtain a placement cost of the candidate position for the moved macro module, and then the routing paths of the moved macro module and the related cells are rerouted and then a routing cost of the candidate position is obtained. As described above, the processor may perform a best SPR calculation procedure according to the cost evaluations of each candidate position, so as to select the best candidate position of each decided macro module having a minimum cost evaluation from the corresponding candidate positions. Next, according to the selected candidate positions, the initial placement is updated by moving the decided macro modules to the selected candidate positions, so as to obtain a new placement. Simultaneously, the routing paths of the selected candidate positions are also obtained. Thus, a new signal path of the specific signal is formed by the moved macro modules and the corresponding routing paths, wherein the new signal path does not pass through the congestion region $Z_{dense}$. Specifically, the placement and the routing can be updated at the same time. FIG. 9 shows another example of a new signal path in the updated placement 10 according to step S360 of FIG. 3. In the embodiment, the processor move the macro module 30E to the suitable positions, so as to further shorten the distance of the new signal path, thus a signal path Path4 is formed. Furthermore, the macro modules 30D and 30E are arranged in a straight line. The nets N11-N12 are the routing paths corresponding to the cell C3, wherein the cell C3 is coupled to the macro module 30C via the net N11, and coupled to the cell C4 and the moved macro module 30E via the net N12. Furthermore, the nets N12-13 are the routing paths corresponding to the cell C4, wherein the cell C4 is coupled to the macro module 30D via the net N13, and coupled to the cell C3 and the moved macro module 30E via the net N12. It should be noted that the processor may move the cells C3 and C4 to obtain the signal path Path4 when the cells C3 or C4 of the signal path Path3 is disposed in the congestion region $Z_{dense}$.

Figure 10:
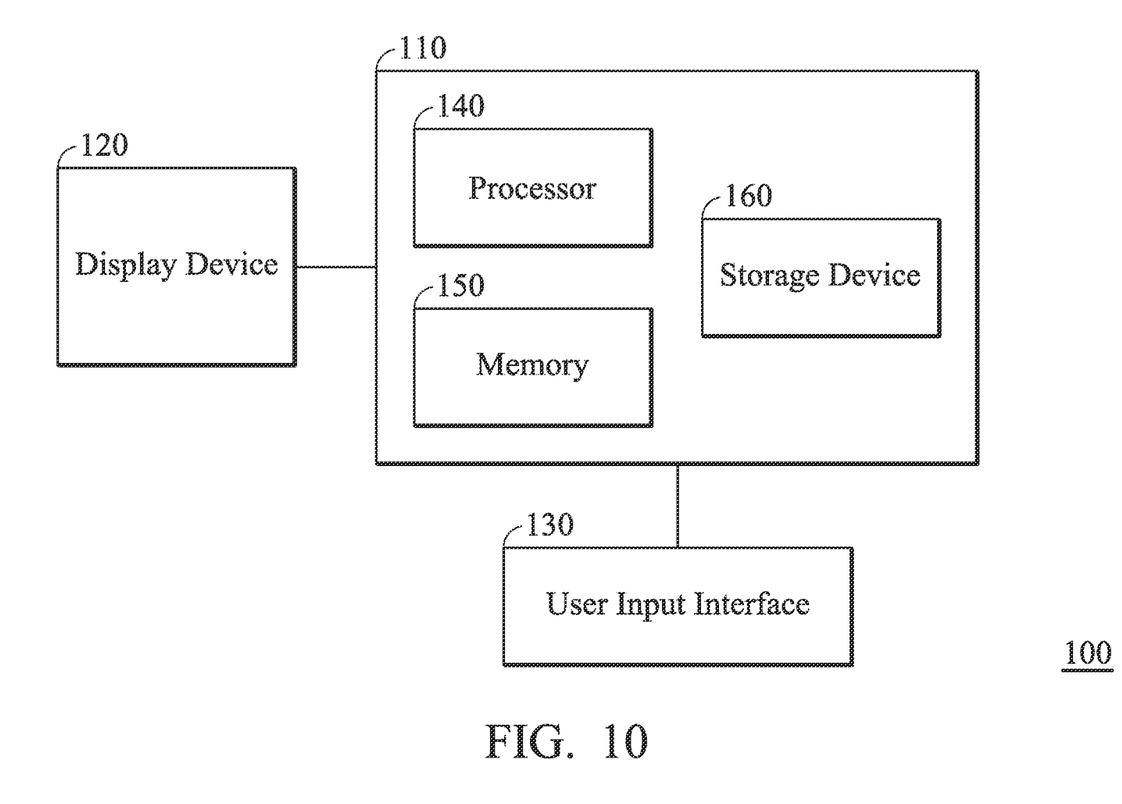
FIG. 10 shows a computer system according to an embodiment of the invention.

FIG. 10 shows a computer system 100 according to an embodiment of the invention. The computer system 100 comprises a computer 110, a display device 120 and a user input interface 130, wherein the computer 110 comprises a processor 140, a memory 150, and a storage device 160. The computer 110 is coupled to the display device 120 and the user input interface 130, wherein the computer 110 is capable of operating an electronic design automation (EDA) tool. Furthermore, the computer 110 is capable of receiving input instruction from the user input interface 130 and displaying the placement and routing of the IC on the display device 120. In one embodiment, the display device 120 is a GUI for the computer 110. Furthermore, the display device 120 and the user input interface 130 can be implemented in the computer 110. The user input interface 130 may be a keyboard, a mouse and so on. In the computer 110, the storage device 160 can store the operating systems (OSs), applications, and data comprising input required by the applications and/or output generated by applications. The processor 140 of the computer 110 can perform one or more operations (either automatically or with user input) in any method that is implicitly or explicitly described in this disclosure. For example, during operation, the processor 140 can load the applications of the storage device 160 into the memory 150, and then the applications can be used by a user to create, view, and/or edit a placement for a circuit design.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for reducing congestion regions in a layout of an integrated circuit, comprising:
   obtaining a placement of the integrated circuit, wherein the placement comprises a first signal path between a first macro module and a second macro module, and the first signal path passes through a routing area of the placement for transmitting a specific signal;
   identifying a congestion region of the routing area, wherein the first signal path comprises at least one cell or at least one routing path in the congestion region;
   obtaining a cost evaluation for each candidate position of the routing area by moving the cell or the routing path out of the congestion region, wherein the candidate position is disposed in a sparse region adjacent to the congestion region in the routing area;
   moving the cell corresponding to the routing path to the candidate position having a minimum cost evaluation among the cost evaluations and moving one of the first and second macro modules according to the moved cell, and simultaneously updating the placement and the routing paths according to the moved cell and the moved macro module; and
   manufacturing the integrated circuit based on the updated placement and the updated routing paths,
   wherein the updated placement comprises a second signal path between the moved macro module and the other macro module for transmitting the specific signal, and the moved cell is located outside the congestion region,
   wherein the first signal path is removed from the updated placement so as to adjust the layout of the integrated circuit.

2. The method as claimed in claim 1, wherein the second signal path comprises the moved cell and the updated routing paths corresponding to the moved cell.

3. The method as claimed in claim 2, wherein the second signal path does not pass through the congestion region, and the first and second macro modules are arranged around the routing area.

4. The method as claimed in claim 1, further comprising:
   dividing the routing area into a plurality of exploration regions; and
   obtaining a cell density and a routing density of each of the exploration regions.

5. The method as claimed in claim 4, wherein the congestion region comprises the exploration regions having the cell density or the routing density greater than a specific density.

6. The method as claimed in claim 1, the step of obtaining the cost evaluation for each of the candidate positions of the routing area by moving the cell or the routing path out of the congestion region further comprises:
   selecting one candidate position from the candidate positions;
   obtaining a placement cost by moving the cell from the congestion region to the selected candidate position;
   obtaining a routing cost by rerouting the routing paths corresponding to the cell moved to the selected candidate position; and
   obtaining the cost evaluation for the selected candidate position according to the placement cost and the routing cost.

7. The method as claimed in claim 6, wherein the routing area is divided into a plurality of exploration regions, and the placement cost comprises a cell density of the exploration region that the selected candidate position is located, and the routing cost comprises a routing density of the exploration region where the selected candidate position is located.

8. The method as claimed in claim 1, wherein positions of the first macro module and the second macro module in the placement are different from the positions of the first macro module and the second macro module in the updated placement.

9. The method as claimed in claim 8, wherein the positions of the first macro module and the second macro module in the updated placement are arranged in a straight line.

10. A non-transitory computer-readable storage medium storing instructions that, when executed by a computer, cause the computer to perform a method for reducing congestion regions in a layout of an integrated circuit, the method comprising:
    obtaining a placement of the integrated circuit, wherein the placement comprises a first signal path between a first macro module and a second macro module, and the first signal path passes through a routing area of the placement for transmitting a specific signal;

identifying a congestion region of the routing area, wherein the first signal path comprises at least one cell or at least one routing path in the congestion region;

obtaining a cost evaluation for each candidate position of the routing area by moving the cell or the routing path of the congestion region, wherein the candidate position is disposed in a sparse region adjacent to the congestion region in the routing area;

moving the cell corresponding to the routing path to the candidate position having a minimum cost evaluation among the cost evaluations and moving one of the first and second macro modules according to the moved cell, and simultaneously updating the placement and the routing paths according to the moved cell and the moved macro module; and manufacturing the integrated circuit based on the updated placement and the updated routing paths, wherein the updated placement comprises a second signal path between the moved macro module and the other macro module for transmitting the specific signal, and the moved cell is located outside the congestion region, wherein the first signal path is removed from the updated placement so as to adjust the layout of the integrated circuit.

11. The non-transitory computer-readable storage medium as claimed in claim 10, wherein the second signal path comprises the moved cell and the updated routing paths corresponding to the moved cell.

12. The non-transitory computer-readable storage medium as claimed in claim 10, the method further comprising:

dividing the routing area into a plurality of exploration regions; and obtaining a cell density and a routing density of each of the exploration regions.

13. The non-transitory computer-readable storage medium as claimed in claim 10, the step of obtaining the cost evaluation for each candidate position of the routing area by moving the cell or the routing path out of the congestion region further comprises:

selecting one candidate position from the candidate positions;

obtaining a placement cost by moving the cell from the congestion region to the selected candidate position;

obtaining a routing cost by rerouting the routing paths corresponding to the cell moved to the selected candidate position; and obtaining the cost evaluation for the selected candidate position according to the placement cost and the routing cost.

14. The non-transitory computer-readable storage medium as claimed in claim 13, wherein the routing area is divided into a plurality of exploration regions, and the placement cost comprises a cell density of the exploration region that the selected candidate position is located, and the routing cost comprises a routing density of the exploration region where the selected candidate position is located.

15. The non-transitory computer-readable storage medium as claimed in claim 10, wherein positions of the first macro module and the second macro module in the placement are different from the positions of the first macro module and the second macro module in the updated placement.

16. The method as claimed in claim 15, wherein the positions of the first macro module and the second macro module in the updated placement are arranged in a straight line.

* * * * *